(12) United States Patent
Nishina et al.

(10) Patent No.: US 11,577,386 B2
(45) Date of Patent: Feb. 14, 2023

(54) GRIPPING METHOD, GRIPPING SYSTEM, AND PROGRAM

(71) Applicant: OMRON Corporation, Kyoto (JP)

(72) Inventors: Yuki Nishina, Ikoma (JP); Yoshinori Konishi, Souraku-gun (JP)

(73) Assignee: OMRON Corporation, Kyoto (JP)

( * ) Notice: Subject to any disclaimer, the term of this patent is extended or adjusted under 35 U.S.C. 154(b) by 253 days.

(21) Appl. No.: 16/135,040

(22) Filed: Sep. 19, 2018

(65) Prior Publication Data

US 2019/0143508 A1 May 16, 2019

(30) Foreign Application Priority Data

Nov. 14, 2017 (JP) .............................. JP2017-218763

(51) Int. Cl.
*B25J 9/16* (2006.01)
*B25J 13/08* (2006.01)

(52) U.S. Cl.
CPC ........... *B25J 9/1612* (2013.01); *B25J 9/1697* (2013.01); *B25J 13/086* (2013.01); *B25J 13/088* (2013.01)

(58) Field of Classification Search
CPC combination set(s) only.
See application file for complete search history.

(56) References Cited

U.S. PATENT DOCUMENTS

| | | | |
|---|---|---|---|
| 2010/0004778 A1 | 1/2010 | Arimatsu et al. | |
| 2011/0010009 A1* | 1/2011 | Saito | B25J 9/1612 700/253 |
| 2011/0251717 A1 | 10/2011 | Furukawa | |
| 2012/0059517 A1* | 3/2012 | Nomura | B25J 9/1679 700/259 |
| 2013/0211593 A1 | 8/2013 | Domae et al. | |

(Continued)

FOREIGN PATENT DOCUMENTS

| | | |
|---|---|---|
| CN | 101618544 A | 1/2010 |
| CN | 102126221 A | 7/2011 |

(Continued)

OTHER PUBLICATIONS

The extended European search report dated Apr. 24, 2019 in a counterpart European patent application.

(Continued)

*Primary Examiner* — Jeff A Burke
*Assistant Examiner* — Zachary Joseph Wallace
(74) *Attorney, Agent, or Firm* — Metrolex IP Law Group, PLLC

(57) ABSTRACT

A gripping method relates to a method for gripping an object using a multi-fingered hand provided with a plurality of fingers. The method includes measuring, using a three-dimensional measurement sensor, an area that contains the object, and obtaining three-dimensional information for each position within the area, and deciding positions of the plurality of fingers for gripping the object, by classifying the area, if the area includes a measured area for which the three-dimensional information could be obtained and an unmeasured area for which the three-dimensional information could not be obtained, into the measured area and the unmeasured area based on the distance-indicating information, the positions of the plurality of fingers being decided based on positions of the unmeasured area.

13 Claims, 13 Drawing Sheets

(56) References Cited

U.S. PATENT DOCUMENTS

| | | | |
|---|---|---|---|
| 2014/0067317 A1* | 3/2014 | Kobayashi | G05D 3/00 |
| | | | 702/153 |
| 2014/0147240 A1 | 5/2014 | Noda et al. | |
| 2014/0154036 A1* | 6/2014 | Mattern | B25J 9/0084 |
| | | | 414/729 |
| 2015/0003678 A1 | 1/2015 | Watanabe et al. | |
| 2015/0273688 A1* | 10/2015 | Harada | B25J 9/1697 |
| | | | 700/259 |
| 2015/0276383 A1 | 10/2015 | Yoshikawa et al. | |
| 2016/0059419 A1 | 3/2016 | Suzuki | |
| 2016/0229062 A1 | 8/2016 | Suzuki | |
| 2016/0257001 A1 | 9/2016 | Blasdel et al. | |
| 2016/0332299 A1* | 11/2016 | Suzuki | G06K 9/00664 |
| 2017/0129101 A1* | 5/2017 | Sonoda | B25J 9/0093 |
| 2017/0177746 A1* | 6/2017 | Gotou | G06F 30/00 |
| 2017/0326739 A1* | 11/2017 | Nakazato | B25J 9/1612 |
| 2018/0341828 A1 | 11/2018 | Wang et al. | |
| 2019/0061159 A1* | 2/2019 | Domae | B25J 9/1676 |
| 2019/0375110 A1* | 12/2019 | Oishi | B25J 13/088 |

FOREIGN PATENT DOCUMENTS

| | | | | | |
|---|---|---|---|---|---|
| CN | 103687702 A | | 3/2014 | | |
| EP | 2263837 A1 | | 12/2010 | | |
| EP | 2993002 A1 | | 3/2016 | | |
| JP | 2010-89238 A | | 4/2010 | | |
| JP | 2013010155 A | * | 1/2013 | | B25J 9/1612 |
| JP | 2014-200882 A | | 10/2014 | | |
| JP | 2015-100866 A | | 6/2015 | | |
| JP | 2015-197312 A | | 11/2015 | | |
| JP | 2017185578 A | * | 10/2017 | | |
| JP | 2018-200558 A | | 12/2018 | | |
| JP | 2019-28770 A | | 2/2019 | | |

OTHER PUBLICATIONS

The Office Action (JPOA) dated Feb. 2, 2021 in a counterpart Japanese patent application.
The Office Action (CNOA) dated Jul. 6, 2021 in a counterpart Chinese patent application.

* cited by examiner

GRIPPING METHOD, GRIPPING SYSTEM, AND PROGRAM

CROSS-REFERENCES TO RELATED APPLICATIONS

This application claims priority to Japanese Patent Application No. 2017-218763 filed Nov. 14, 2017, the entire contents of which are incorporated herein by reference.

FIELD

The disclosure relates to a gripping method, a gripping system, and a program.

BACKGROUND

As a method for gripping a workpiece using a multi-fingered hand, JP5558585B discloses a workpiece pick-up method in which the gripping position/posture is derived based on workpiece measurement data obtained by three-dimensionally measuring a workpiece and hand shape data for gripping the workpiece.

JP5558585B describes, as a unit for obtaining the three-dimensional workpiece measurement data, for example, a twin-lens or multiple-lens stereo camera, a stereo camera of the active stereo measurement method that is provided with a light projecting unit such as a laser or a projector and a camera, or the like.

JP5558585B is an example of background art.

SUMMARY

In a stereo measurement method as described above, it is generally known that there are areas for which no three-dimensional workpiece measurement data can be obtained due to occlusion. Furthermore, it is also known that, in addition to such areas caused due to occlusion, there are areas for which no three-dimensional workpiece measurement data can be obtained depending on the state of the surface of a workpiece to be measured. In this case, even if a user tries to derive the gripping position/posture based on workpiece measurement data and hand shape data for gripping workpieces, he or she cannot derive the gripping position/posture for a workpiece located near the area for which no measurement data can be obtained, and thus cannot grip the workpiece. Accordingly, one or more aspects may provide a gripping method, a gripping system, and a program by which an object can be gripped even if an area that contains the object includes an area for which no three-dimensional measurement information can be obtained.

According to one aspect, provided is a gripping method for gripping an object using a multi-fingered hand with a plurality of fingers. The method includes a step of measuring, using a three-dimensional measurement sensor, an area that contains the object, to obtain three-dimensional information for each position within the area, and a step of deciding positions of the plurality of fingers for gripping the object, by classifying the area, if the area includes an area for which the three-dimensional information could not be obtained in the previous step, into a measured area and an unmeasured area based on the distance-indicating information, the positions of the plurality of fingers being decided based on positions of the unmeasured area.

According to one aspect, it is possible to decide a gripping position that is appropriate for avoiding positions in the unmeasured area.

The step of deciding positions of the plurality of fingers may include a step of deciding positions of the plurality of fingers so that the plurality of fingers are present in the measured area.

According to one aspect, since the positions of the plurality of fingers are decided so that the plurality of fingers are present in the measured area, it is possible to grip an object without interfering with the object even if the object is present in the unmeasured area.

The step of deciding positions of the plurality of fingers may include a step of determining whether or not any of the plurality of fingers are present in the unmeasured area, and a step of deciding, if it is determined that the plurality of fingers are present in the unmeasured area, the positions of the plurality of fingers so that the plurality of fingers are present in the measured area.

According to one aspect, since the positions of the plurality of fingers are decided so that the plurality of fingers are present in the measured area, it is possible to grip an object without interfering with it even if the object is present in the unmeasured area.

A step of setting a position and a posture of the multi-fingered hand is further included, and the step of deciding positions of the plurality of fingers may further include a step of determining whether or not any of finger areas that correspond to the positions of the plurality of fingers based on the set position and posture of the multi-fingered hand include the unmeasured area, and a step of setting, if any of the finger areas include the unmeasured area, the distance between the plurality of fingers so that the finger areas do not include the unmeasured area.

According to one aspect, since the distance between the plurality of fingers is set so that the finger areas do not include the unmeasured area, it is possible to grip an object without interfering with it even if the object is present in the unmeasured area.

A step of setting a position and a posture of the multi-fingered hand is further included, and the step of deciding positions of the plurality of fingers may further include a step of determining whether or not finger areas that correspond to the positions of the plurality of fingers based on the set position and posture of the multi-fingered hand include the unmeasured area, and a step of interpolating, if the finger areas include an unmeasured area between measured areas in which the plurality of fingers can move, the unmeasured area using the closer (smaller) one of the distances obtained at boundaries between the unmeasured area and the measured areas, and a step of determining a likelihood of interference with the object based on the three-dimensional information of the interpolated unmeasured area and the position and posture of the multi-fingered hand.

According to one aspect, since the unmeasured area between measured areas in which the plurality of fingers can move is interpolated using the closer (smaller) one of the distances obtained at the boundaries between the unmeasured area and the measured areas, it is possible to determine the likelihood of interference with an unmeasured area that is unlikely to interfere therewith took out.

A step of interpolating the unmeasured area between measured areas in which the plurality of fingers can move, using the farther (larger) one of the distances obtained at the boundaries between the unmeasured area and the measured areas, and a step of deciding a position and a posture of the multi-fingered hand based on the three-dimensional information of the interpolated unmeasured area and the three-dimensional information may be included.

According to one aspect, since the unmeasured area is interpolated using the farther (larger) one of the distances obtained at the boundary between the unmeasured area and the measured area, it is easy to extract edges of an object.

A step of approaching the object with the set distance between the fingers by moving the multi-fingered hand and a robot arm that is connected thereto, and a step of reducing the distance between the fingers to grip the object may be included.

According to one aspect, it is possible to grip an object without interfering with it.

According to one aspect, a gripping system includes a multi-fingered hand provided with a plurality of fingers for gripping an object, a robot arm to which the multi-fingered hand is connected, an obtaining unit configured to obtain, from a three-dimensional measurement sensor for measuring an area that contains the object, three-dimensional information for each position within the area, a deciding unit configured to decide positions of the plurality of fingers for gripping the object, by classifying the area, if the area includes an unmeasured area for which the three-dimensional information cannot be obtained, into a measured area and the unmeasured area based on the distance-indicating information, the positions of the plurality of fingers being decided based on positions of the unmeasured area.

According to one aspect, it is possible to provide a gripping system that decides a gripping position appropriate for avoiding the position of an unmeasured area.

The deciding unit may be configured to decide the positions of the plurality of fingers so that the plurality of fingers are present in the measured area.

According to one aspect, since the positions of the plurality of fingers are decided so that the plurality of fingers are present in the measured area, it is possible to grip an object without interfering with it even if the object is present in the unmeasured area.

The deciding unit may also be configured to determine whether or not any of the plurality of fingers are present in the unmeasured area, and to decide, if it is determined that the plurality of fingers are present in the unmeasured area, the positions of the plurality of fingers so that the plurality of fingers are present in the measured area.

According to one aspect, since the distance between the plurality of fingers is set so that the finger areas do not include an unmeasured area, it is possible to grip an object without interfering with it even if the object is present in the unmeasured area.

According to one aspect, provided is a program for gripping an object using a multi-fingered hand with a plurality of fingers. The program causes a computer to execute a step of measuring, using a three-dimensional measurement sensor, an area that contains the object, to obtain three-dimensional information, and a step of deciding positions of the plurality of fingers for gripping the object, by classifying the area, if the area includes an unmeasured area for which the distance-indicating information could not be obtained in the previous step, into a measured area and the unmeasured area based on the distance-indicating information, the positions of the plurality of fingers being decided based on positions of the unmeasured area.

According to one aspect, it is possible to decide a gripping position appropriate for avoiding the position of the unmeasured area.

The step of deciding positions of the plurality of fingers may also include a step of deciding positions of the plurality of fingers so that the plurality of fingers are present in the measured area. According to one aspect, since the positions of the plurality of fingers are decided so that the plurality of fingers are present in the measured area, it is possible to grip an object without interfering with it even if the object is present in the unmeasured area.

According to one aspect, since the positions of the plurality of fingers are decided so that the plurality of fingers are present in the measured area, it is possible to grip an object without interfering with it even if the object is present in the unmeasured area.

The step of deciding positions of the plurality of fingers may also include a step of determining whether or not any of the plurality of fingers are present in the unmeasured area, and a step of deciding, if it is determined that any of the plurality of fingers are present in the unmeasured area, the positions of the plurality of fingers so that the plurality of fingers are present in the measured area.

According to one aspect, since the positions of the plurality of fingers are decided so that the plurality of fingers are present in the measured area, it is possible to grip an object without interfering with it even if the object is present in the unmeasured area.

According to one or more aspects, it is possible to provide a gripping method, a gripping system, and a program by which an object can be gripped even if an area that contains the object includes an area for which three-dimensional measurement information cannot be obtained.

DETAILED DESCRIPTION

Application Example

Figure 1:
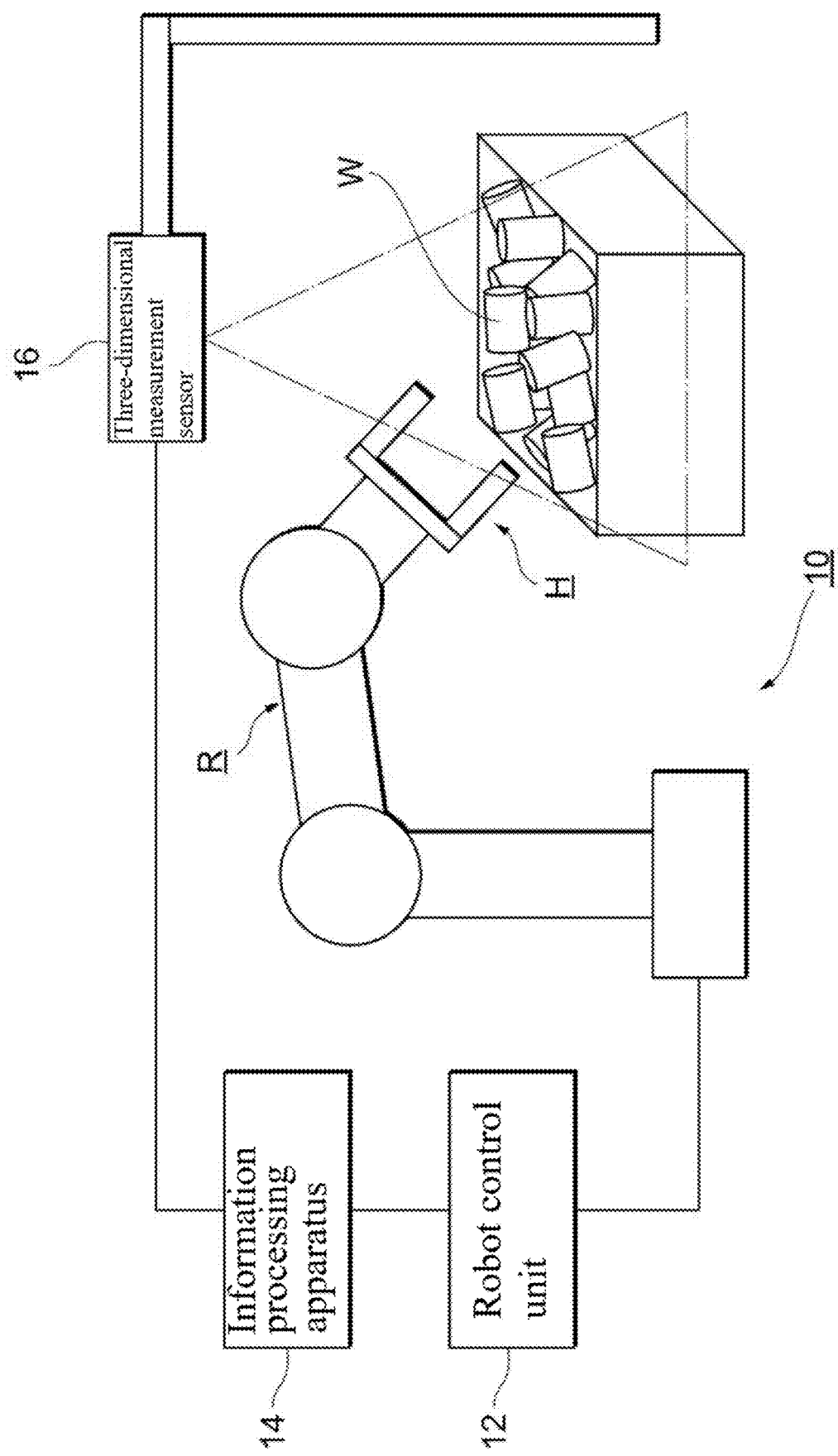
FIG. 1 is a diagram illustrating a hardware configuration of a gripping system according to a first embodiment.

The following will first describe, as an example of a case to which an aspect is applied, a gripping method that is performed when an object to be gripped (also referred to as a "workpiece") is gripped using a robot arm with a multi-fingered hand. In the gripping method, a range image sensor (an example of a "three-dimensional measurement sensor") is used to capture an image of the object to be gripped, and the position and posture of the multi-fingered hand (also referred to simply as a "hand") are controlled based on the obtained range image data (an example of "three-dimensional information"). Also, if an image of an area that contains the object to be gripped is captured by the range image sensor, and the area includes an area for which no range information can be obtained, then information relating to this area is used to decide the positions and the postures of the fingers for gripping the object. Note that it is not always necessary to use information relating to all of the image elements for which no range information can be obtained, and, for example, an area made of a set of adjacent image elements for which no range information can be obtained in relation to the object may be extracted as an unmeasured area, and the positions and the postures of the fingers for gripping the object may be decided. Hereinafter, "unmeasured area" refers to, of all the areas for which no range information can be obtained, an area that is extracted as being useful for gripping the object.

Specifically, first, an image of the object is captured using the range image sensor, and range image data of a captured area containing the object is obtained. At this time, positional information of the unmeasured area for which no range image data can be obtained is also obtained at the same time.

Then, the positions and the postures of the fingers for gripping the object are set based on the range image data.

If the shape of the object is known, the positions and the postures of the fingers that are appropriate for gripping the object can be set based on object shape data that have been obtained in advance and the range image data. If the shape of the object is unknown, edges of the object can be detected based on the range image data, and the positions, and the postures of the fingers that are appropriate for gripping the object can be set. Specifically, the positions and the postures of the fingers constituting the multi-fingered hand can be specified based on seven-dimensional information in total that includes six-dimensional information for specifying the position and posture of the multi-fingered hand connected to a link at the distal end of the robot, and one-dimensional information for specifying the distance between the fingers.

Then, it is determined whether or not the set positions of the fingers include an unmeasured area. Specifically, it is determined whether or not the imaging area of the range image sensor includes an overlap region between an area occupied by a projected finger and an unmeasured area.

If the positions of the fingers when gripping do not include an unmeasured area, those positions and the posture are decided as optimum. Specifically, the multi-fingered hand approaches the object with the decided position and the posture while keeping the decided distance between the fingers, and then reduces the distance between the fingers to grip the object.

On the other hand, if the positions of the fingers when gripping include an unmeasured area, the position and posture are set again so that the distance between the fingers is increased. Then, whether or not the positions of the fingers include an unmeasured area is again determined.

If the positions of the fingers when gripping do not include an unmeasured area, those positions and the posture are decided as optimum, and the multi-fingered hand approaches the object with the decided position and the posture while keeping the decided distance between the fingers, and then reduces the distance between the fingers to grip the object.

On the other hand, if the positions of the fingers when gripping still include an unmeasured area, the positions and the postures are set yet again so that the distance between the fingers is further increased.

As a result of repeating these processes, it is possible to decide the distance between the fingers so that the positions of the fingers when gripping do not include an unmeasured area. Accordingly, even if the object is located in an unmeasured area, it is possible to grip the object without damaging or breaking it.

Note that, in order to decide the positions of the fingers when gripping so that they do not include an unmeasured area, it is also possible to extract a plurality of grippable position options, and select an option that does not include an unmeasured area as a gripping position.

The foregoing has described a multi-fingered hand of the so-called outer diameter gripping type that grips an object by moving the fingers from the outer side of the object and decreasing the distance between the fingers. However, the gripping method of an embodiment is also applicable to a multi-fingered hand of the so-called inner diameter gripping type that grips an object by moving the fingers on the inner side of, for example, a ring-shaped object and increasing the distance between the fingers. In this case, if the positions of the fingers when gripping include an unmeasured area, the position and posture are set again so that the distance between the fingers are further decreased.

Accordingly, since positional information of an unmeasured area is obtained and the positions of the fingers when gripping are decided so as to not include the area, it is possible to grip the object without damaging and breaking it.

Note that "three-dimensional information" typically refers to range image data constituted by range data obtained for each image element (pixel). Note however that three-dimensional information is not limited to this, and may be any information as long as the distance to the reference position is reflected thereon. Furthermore, accurate range information is not necessarily needed.

Furthermore, "unmeasured area" refers to part of an area captured by using a range image sensor or the like for which no range information could be obtained. Here, an area for which no range information could be obtained but range information was interpolated based on range information of surrounding areas, or the like may also be referred to as "unmeasured area".

First Embodiment

Hereinafter, embodiments will be described with reference to the drawings.

Figure 2:
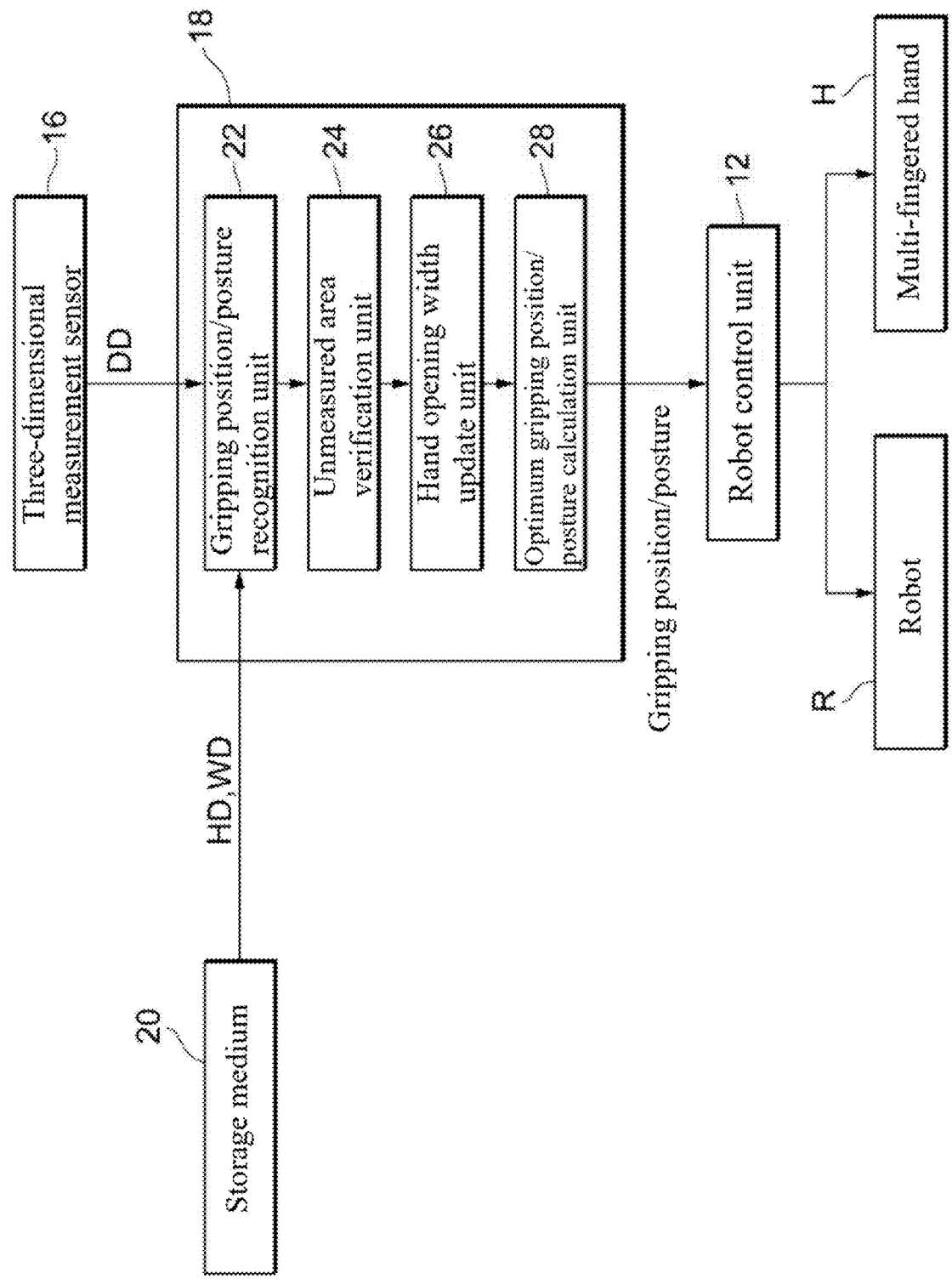
FIG. 2 is a functional block diagram illustrating a gripping system according to a first embodiment.

FIG. 1 is a diagram illustrating a hardware configuration of a gripping system 10 according to an embodiment. Furthermore, FIG. 2 is a functional block diagram of the gripping system 10.

The gripping system 10 includes a robot R. The robot R is a multi-axis and multi-joint robot arm, and is provided with a base fixed to the floor surface, a plurality of joints each functioning as a movable shaft, a plurality of links that are rotated in accordance with the movable shafts of the joints, and a servomotor for rotating the links. Furthermore, a multi-fingered hand H (also referred to simply as "hand") with two fingers is coupled to the link at the distal end. Each of the fingers of the multi-fingered hand H is configured to be movable one-dimensionally, and the distance between the two fingers can be changed in accordance with an instruction received from a robot control unit 12 (also referred to as "robot control apparatus 12").

The robot control unit 12 generates control instructions to control the robot R and the multi-fingered hand H based on information for designating the gripping position/posture that is received from an information processing apparatus 14, and outputs the generated control instructions to the robot R and the multi-fingered hand H.

A three-dimensional measurement sensor 16 captures an image of an area that contains a workpiece W, which is an object to be gripped, and outputs, for each image element (also referred to as "pixel"), range data relating to a distance between the three-dimensional measurement sensor 16 and an object present in this area (there may also be cases where no range data can be obtained). Here, a set of the range data (there may also be where no range data can be obtained) that are output for the image elements from the three-dimensional measurement sensor 16 is referred to as "range image data DD".

The three-dimensional measurement sensor 16 may be of any type as long as it can obtain range information for a plurality of positions within the captured area. The three-dimensional measurement sensor 16 may be, for example, a sensor of the TOF (Time Of Flight) type that emits a laser and obtains the range based on, for example, the received time or phase of reflected light thereof, a sensor of the pattern irradiation type that emits a laser beam with a predetermined pattern, and performs range measurement based on the pattern of reflected light thereof, a sensor with a laser range finder that emits an infrared laser and performs range measurement based on reflected light thereof, or a sensor with a stereo camera that uses a twin-lens or multiple-lens camera to measure the range.

Furthermore, the three-dimensional measurement sensor 16 may be fixed above the workpiece W or may be fixed to the link at the distal end of the robot R, or the like.

For the information processing apparatus 14, it is possible to employ, for example, a general-purpose personal computer as hardware. The information processing apparatus 14 is constituted by an information processing unit 18 provided with a not-shown processor for executing various types of arithmetic processing shown in an embodiment, and a storage medium 20 provided with a nonvolatile memory, such as a HDD or a flash memory, for storing hand shape data HD of the multi-fingered hand H, workpiece shape data WD of the workpiece W, computer-readable programs for realizing types of processing shown in an embodiment, and the like.

The information processing unit 18 is provided with a gripping position/posture recognition unit 22, an unmeasured area verification unit 24, a hand opening width update unit 26, and an optimum gripping position/posture calculation unit 28. The gripping position/posture recognition unit 22 recognizes the gripping position/posture for gripping the workpiece W based on the range image data DD, and the hand shape data HD and the workpiece shape data WD that are read out from the storage medium 20. The unmeasured area verification unit 24 compares, of the image area captured by the three-dimensional measurement sensor 16, finger areas that are occupied by the fingers of the multi-fingered hand H and are calculated based on information relating to the gripping position/posture recognized by the gripping position/posture recognition unit 22, with unmeasured areas UA obtained based on the range image data DD. If it is determined by the unmeasured area verification unit 24 that the areas occupied by the fingers of the multi-fingered hand H include an unmeasured area UA, the hand opening width update unit 26 updates the opening width so that the distance between the fingers of the multi-fingered hand H is increased. The optimum gripping position/posture calculation unit 28 decides, as an optimum gripping position/posture, a gripping position/posture at which the areas occupied by the fingers of the multi-fingered hand H do not include an unmeasured area UA.

Note that the information processing unit 18 is provided with a not-shown storage means constituted by a volatile memory for temporarily storing various types of data received from the three-dimensional measurement sensor 16 and the storage medium 20, data that is subjected to arithmetic processing in the blocks 22 to 28, and the like.

Figure 3:
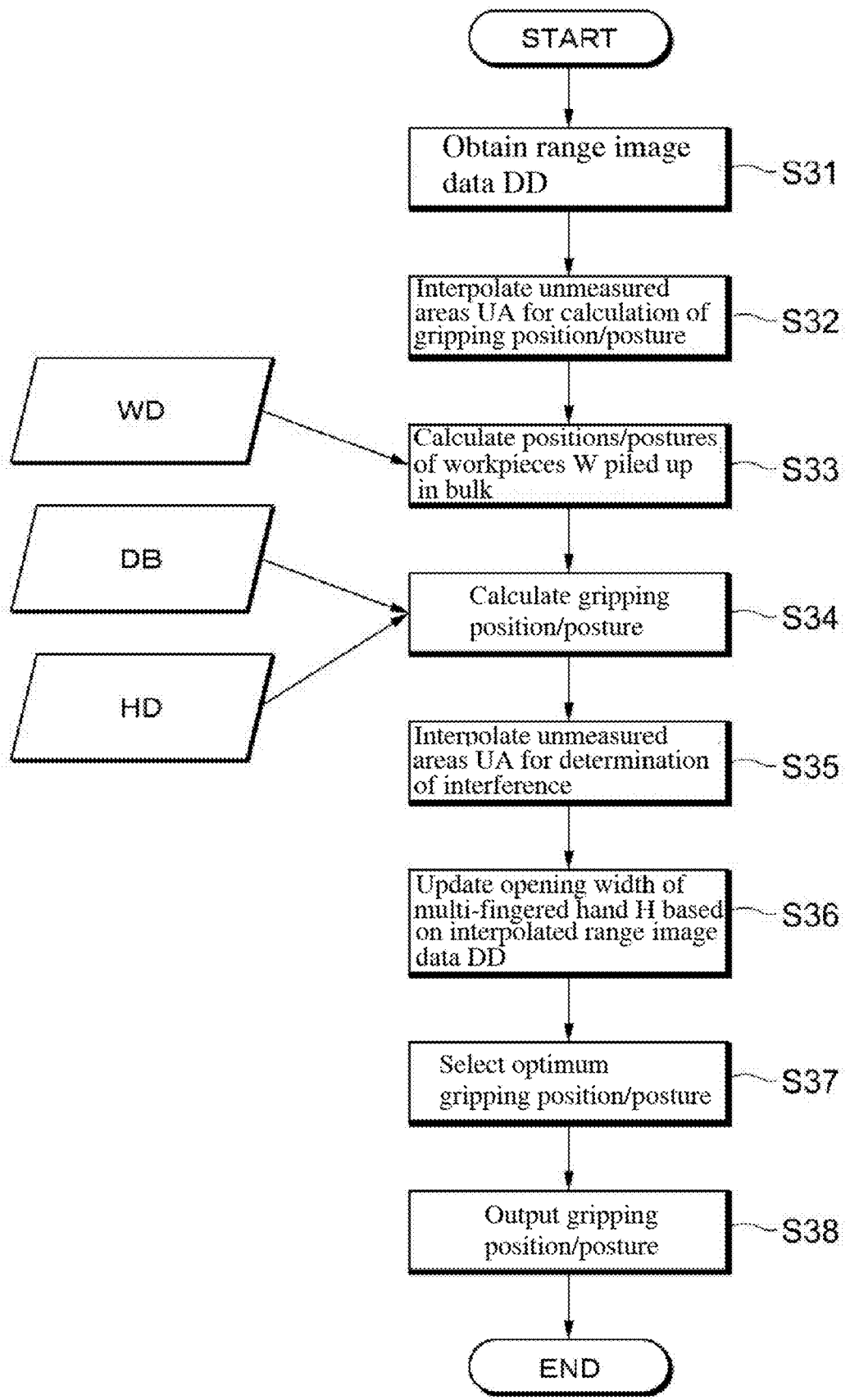
FIG. 3 is a flowchart illustrating a gripping method according to a first embodiment.

The following will describe a gripping method according to an embodiment with reference to FIG. 3.

In an embodiment, workpieces W, which are objects to be gripped, are components having a predetermined three-dimensional shape or objects having the same basic three-dimensional shape but having individual differences (for example, fishes or fruits of the same type). The three-dimensional workpiece shape data WD of the workpieces W is stored in advance in the storage medium 20.

Furthermore, the gripping system 10 selects one of a plurality of workpieces W freely piled up in bulk (unordered) and grips the selected workpiece W. Note however that the present invention is not limited to this, and, for example, the gripping system 10 may also grip workpieces W conveyed on a belt conveyor in order.

First, the three-dimensional measurement sensor 16 captures an image of an area including at least one workpiece W and obtains range image data DD (step S31). The range image data DD can be displayed on a not-shown display apparatus as a two-dimensional image in which portions are displayed brighter, the closer they are to the viewer.

Here, there may be a case where range data cannot be obtained for some image elements. For example, if a significant amount of reflected light cannot be obtained due to occlusion resulting from the dead corner of the stereo camera, or the normal of the object surface having an angle almost perpendicular to the normal of the imaging area of the sensor, range data will cannot be obtained. Furthermore, also if an image of a low-reflection object or conversely a specular reflection object is captured, range data cannot be obtained. The range image data DD also includes information relating to an image element for which no range data cannot be obtained for such a reason.

Figure 4:
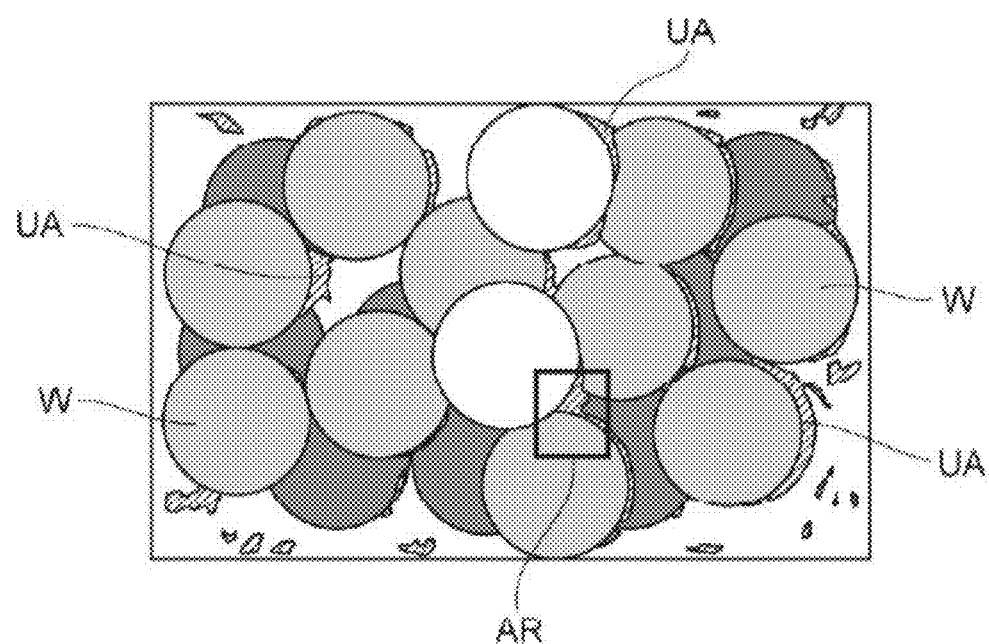
FIG. 4 is a diagram illustrating an example of a range image of a plurality of workpieces that are piled up in bulk.

FIG. 4 is an example showing range image data obtained by capturing an image of a plurality of workpieces W (fruits, oranges) piled up in bulk as an image in which the workpieces W are brighter, the closer they are to a viewer. As shown in the figure, the observer's right side of each workpiece W includes an unmeasured area UA for which no range data can be obtained due to occlusion or the like.

Then, the gripping position/posture recognition unit 22 interpolates range data of the unmeasured areas UA (step S32).

Then, the gripping position/posture recognition unit 22 reads out the workpiece shape data WD from the storage medium 20, executes pattern matching between the workpiece shape data WD and the range image data DD in which the range data of the unmeasured areas UA has been interpolated in step S32, extracts workpieces W present in the range image data DD, and calculates the positions and postures of the workpieces W (step S33).

Then, the gripping position/posture recognition unit 22 obtains, from a gripping position database DB, grip-position information specifying the position (grippable position) at which a workpiece W can be gripped. The grip-position information is information specifying, using a teaching pendant or the like, the position at which a given workpiece W can be gripped. The grip-position information may include a plurality of grippable positions with respect to one workpiece W. Furthermore, score information associated with each grippable position may also be included. Here, the grip-position information refers to information that includes, in a case of a multi-fingered hand H with two fingers, a pair of two grippable positions.

Furthermore, the gripping position/posture recognition unit 22 reads out the hand shape data HD from the storage medium 20. Then, the gripping position/posture recognition unit 22 calculates the gripping position/posture of the multi-fingered hand H for gripping the workpiece W based on the information relating to the position/posture of the workpiece W extracted in step S33, the grip-position information, and the hand shape data HD (step S34). Here, the calculated gripping position/posture is seven-dimensional information that is constituted by six-dimensional information for specifying the position and posture of the multi-fingered hand H, which corresponds to the distal end of the robot R, and one-dimensional information for defining the opening width between the fingers of the multi-fingered hand H.

Then, the unmeasured area verification unit 24 determines whether or not any of finger areas that are occupied by the fingers of the multi-fingered hand H and were calculated based on the gripping position/posture recognized by the gripping position/posture recognition unit 22 include an unmeasured area UA that is obtained based on the range image data DD (step S35).

If it is determined that any of the finger areas, occupied by the fingers of the multi-fingered hand H, include an unmeasured area UA, the hand opening width update unit 26 updates the opening width (opening degree) of the multi-fingered hand H so that the areas occupied by the fingers of the multi-fingered hand H no longer include an unmeasured area UA (step S36).

Figure 5:
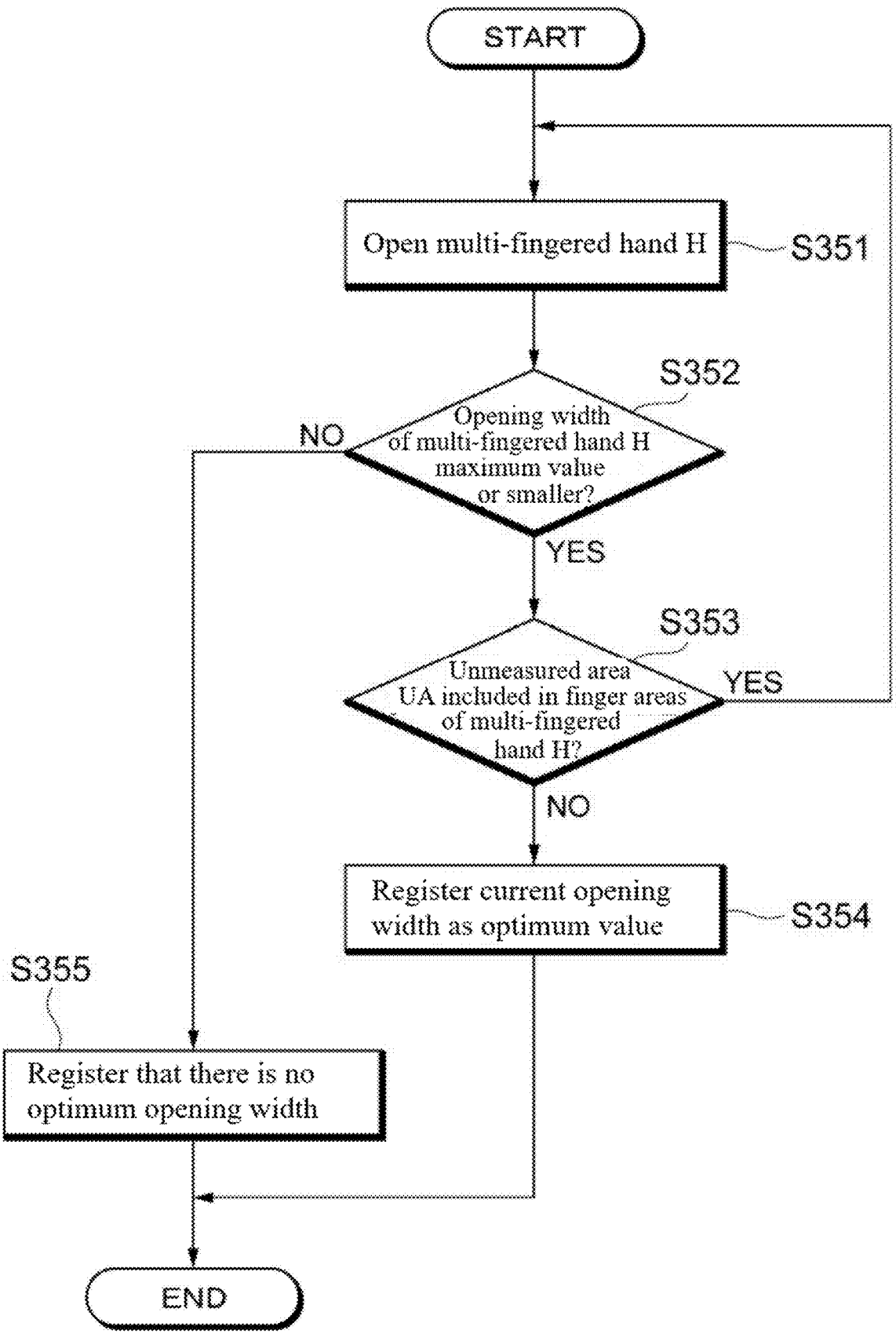
FIG. 5 is a flowchart illustrating a gripping method (sub steps) according to a first embodiment.

The steps S35 and S36 may be constituted by sub steps S351 to S355 shown in FIG. 5.

First, the opening width of the multi-fingered hand H calculated in step S34 is set as the initial value (sub step S351).

Then, it is determined whether or not the set opening width of the hand H exceeds the maximum value of the opening width of the multi-fingered hand H (sub step S352)

If it is determined that the opening width of the multi-fingered hand H exceeds the maximum value of the opening width of the multi-fingered hand H, it is determined that there is no optimum opening width, and the process for gripping the workpiece W is ended (sub steps S355).

If the opening width of the multi-fingered hand H is equal to or smaller than the maximum value of the opening width of the hand H, it is determined whether or not any of the areas occupied by the fingers of the multi-fingered hand H include an unmeasured area UA (sub step S353). Specifically, the following procedure will be executed.

First, finger areas, occupied by the fingers of the multi-fingered hand H, of the captured area defined by image coordinates constituting the range image data DD are calculated.

Here, image coordinates (x, y) that are obtained when projecting a point specified by three-dimensional positional coordinates (X, Y, Z) onto the plane defined by the image coordinates constituting the range image data DD can be calculated by the following perspective projection formula.

$$x = f\frac{X}{Z} + c_x, \; y = f\frac{Y}{Z} + c_y \qquad \text{[Formula 1]}$$

where f is a focal length of the three-dimensional measurement sensor 16, and Cx and Cy are image coordinates of the center of the three-dimensional measurement sensor 16.

Accordingly, by calculating the three-dimensional positional coordinates of the tips of the fingers of the multi-fingered hand H based on the gripping position/posture of the multi-fingered hand H calculated in step S34, and applying the formula above for each tip to calculate its position on the image coordinates, it is possible to calculate the areas enclosed by the positions of the tips on the image coordinates, as the finger areas occupied by the fingers of the multi-fingered hand H.

Then, it is determined whether or not the areas occupied by the fingers of the multi-fingered hand H on the image coordinates include an unmeasured area UA (sub step S353).

If it is determined that the finger areas occupied by the fingers of the multi-fingered hand H do not include an unmeasured area UA, the current opening width is registered as an optimum value (sub step S354). Then, the position and posture of the multi-fingered hand H set in step S34 and the opening width between the fingers of the multi-fingered hand H registered as an optimum value in sub step S354 are selected as the optimum gripping position/posture for gripping the workpiece W (step S37).

If it is determined that any of the finger areas occupied by the fingers of the multi-fingered hand H include an unmeasured area UA, the hand opening width update unit 26 updates the opening width so that it is increased by a predetermined amount (sub step S351).

Then, sub steps S352 and S353 are executed similarly.

If it is determined, before the opening width reaches the maximum value, that the finger areas occupied by the fingers of the multi-fingered hand H do not include an unmeasured area UA, the current opening width is registered as an optimum value (sub step S354), and the optimum gripping position/posture for gripping the workpiece W is decided (step S37).

Then, the information processing unit 18 outputs information relating to the optimum gripping position/posture to the robot control unit 12 (step S38).

The robot control unit 12 outputs a control instruction to instruct the robot R and the multi-fingered hand H to take the input optimum gripping position/posture.

The robot R and the multi-fingered hand H approach the workpiece W with the optimum gripping position/posture in accordance with the control instruction, and then reduce the width between the fingers of the multi-fingered hand H based on the control instruction output from the robot control unit 12, and grip the workpiece W.

The following will describe effects of the above-described gripping method with reference to FIGS. 6A, 6B, 7A and 7B.

Figure 6B:
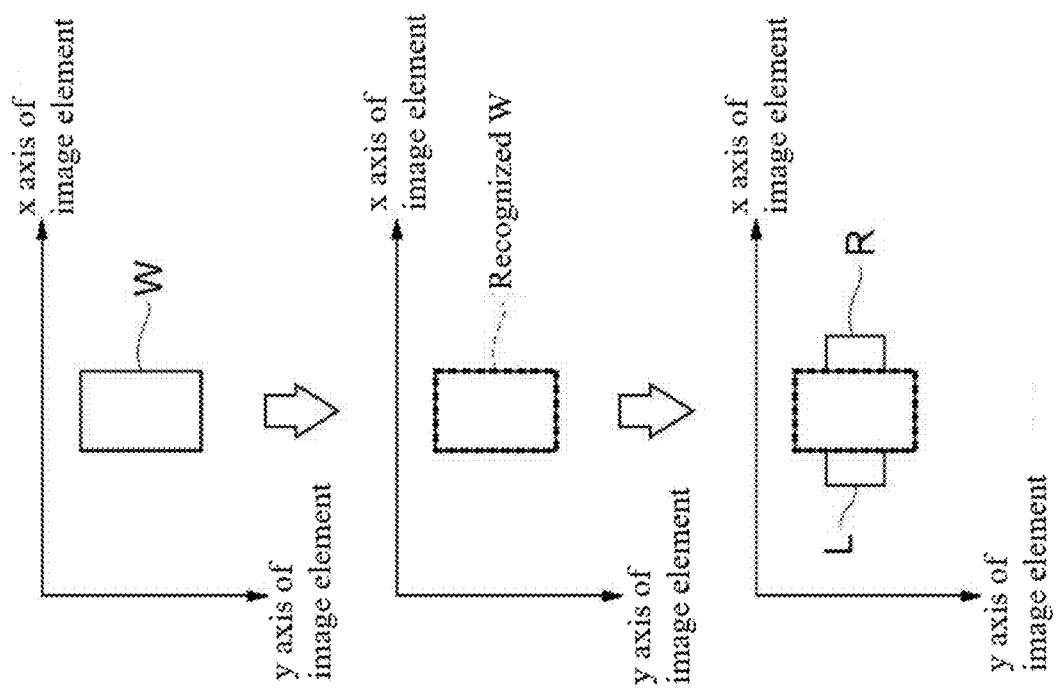
FIG. 6A and FIG. 6B are diagrams illustrating problems caused by unmeasured areas within range image data.
Figure 6A:
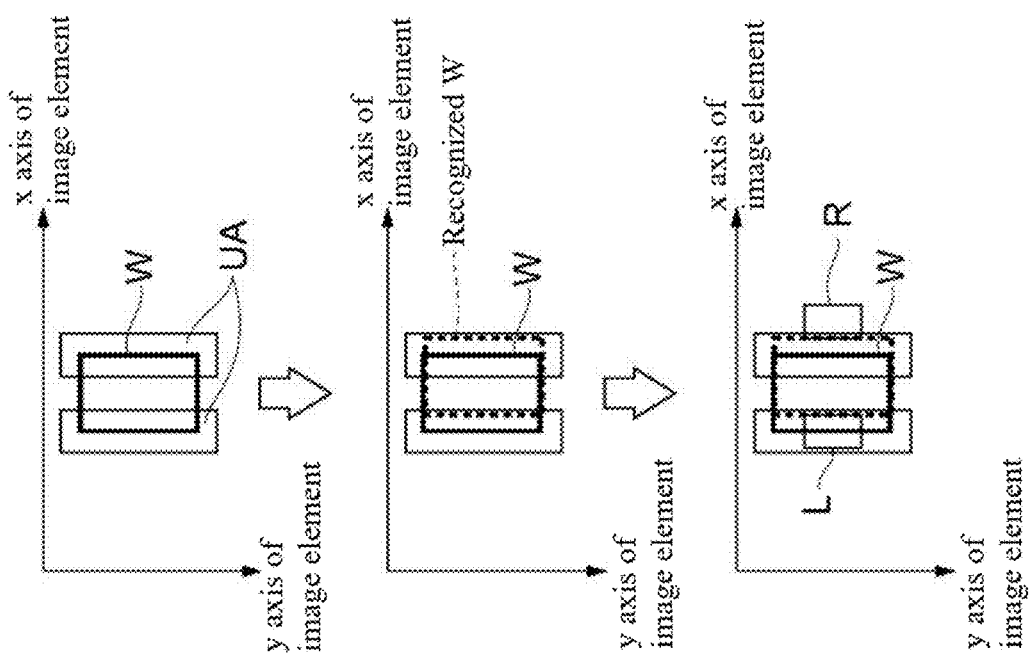

FIG. 6A shows a case where the range image data DD obtained when the three-dimensional measurement sensor 16 is used to capture an image of a workpiece W does not include an unmeasured area UA, and FIG. 6B shows an example in which, when unmeasured areas UA are present, the workpiece W is gripped using a gripping method of a comparative example. Note that, in FIG. 6, the workpiece W indicated by a solid line represents an area in which the workpiece W is actually present, and the workpiece W indicated by a dotted line represents an area of the workpiece W recognized based on the range image data DD.

In the case shown in FIG. 6A, range data is obtained for the entire area of the workpiece W (see upper diagram of FIG. 6A). Accordingly, the position of the workpiece W recognized based on the range image data DD corresponds to the area in which the workpiece W is present (see middle diagram of FIG. 6A). Accordingly, when the workpiece W is gripped, the left finger L and the right finger R of the multi-fingered hand H do not interfere with (bump into) the workpiece W (see lower diagram of FIG. 6A).

On the other hand, in the case of the comparative example shown in FIG. 6B, the unmeasured areas UA include part of the workpiece W, and thus range data for the partial areas of the workpiece W could not be obtained (see upper diagram of FIG. 6B). Accordingly, it is necessary, for example, to interpolate the range data of the unmeasured areas UA based on the range image data DD to recognize the position of the workpiece W. Therefore, there may be cases where the workpiece W is recognized in deviation (dotted line) from the actual position (solid line) of the workpiece W (see middle diagram of FIG. 6B). As a result, the left finger L of the multi-fingered hand H interferes with the workpiece W.

Figure 7A:
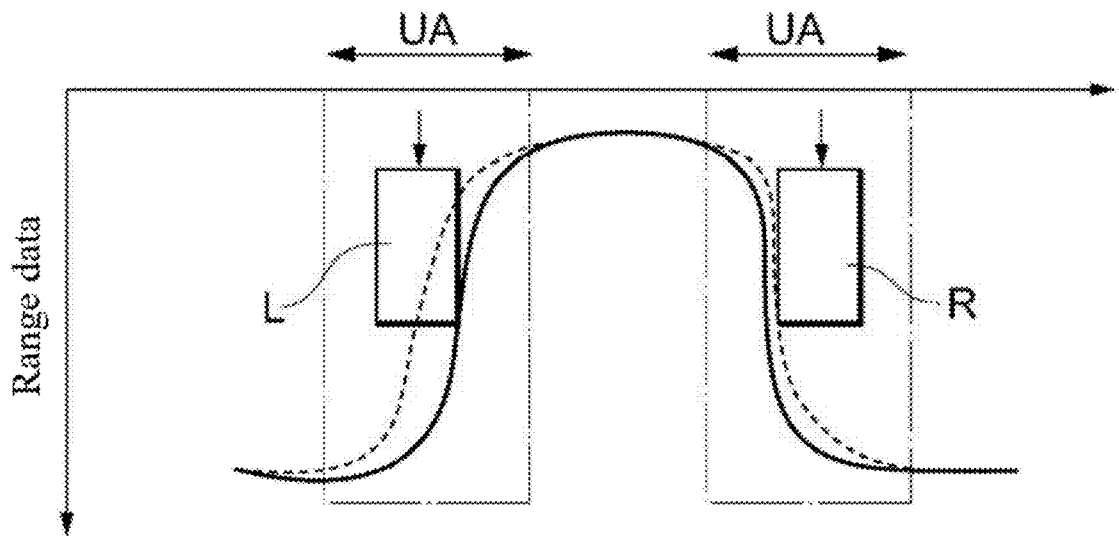
FIG. 7A and FIG. 7B are diagrams illustrating a relationship between motion directions of fingers of a multi-fingered hand, and unmeasured areas.
Figure 7B:
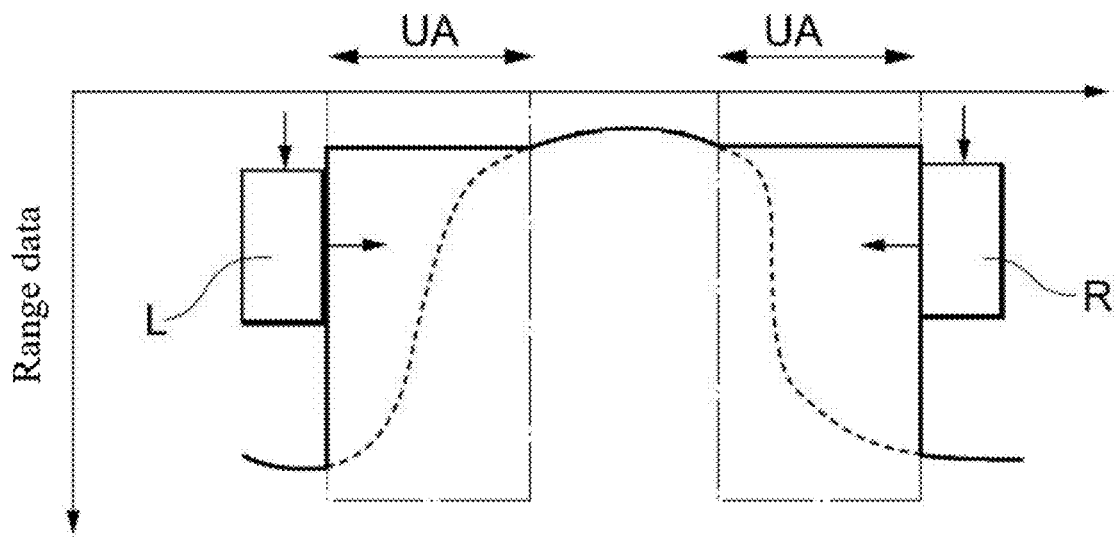

FIG. 7A and FIG. 7B show, on a cross section including operation areas of the fingers L and R of the multi-fingered hand H, motion directions of the fingers L and R, the actual cross section (dotted line) of the workpiece W, and the cross section (solid line) in which the unmeasured areas UA have been interpolated. FIG. 7A shows the gripping method of the comparative example, and FIG. 7B shows the gripping method according to an embodiment.

In the case of the comparative example, as a result of the interpolation in the unmeasured areas UA, the width of the workpiece W has become smaller than that of the actual workpiece W. Accordingly, when the multi-fingered hand H advances toward the workpiece W, the finger L collides with the workpiece W. This may wreak enormous damage, such as the workpiece W being damaged, and the operation process being stopped.

In the case of an embodiment, after the gripping position/ posture of the multi-fingered hand H when gripping the workpiece W has been decided, the entire ranges, along the axis in the direction in which the multi-fingered hand H is opened and closed, of the unmeasured areas UA are interpolated using the closer (smaller) one of adjacent distances represented by the range data, and the opening width of the multi-fingered hand H is set so that the multi-fingered hand H does not interfere with the workpiece W or the like even based on the interpolated range image data DD. Then, by advancing toward the workpiece W while keeping an opening width that is equal to or larger than this opening width at least in the vicinity of the workpiece W, and then reducing the distance between the fingers of the hand H, the multi-fingered hand H can grip the workpiece W without damaging it.

Since, in this way, the multi-fingered hand H approaches the workpiece W with the opening width set so that the left finger L and the right finger R of the multi-fingered hand H do not include an unmeasured area UA, and after a reasonable period of time, the fingers of the multi-fingered hand H are brought closer to each other to grip the workpiece W, there is the effect that the workpiece W is not damaged even if the workpiece W is present in an unmeasured area UA.

Note that, when searching for the optimum opening width while changing the opening width of the multi-fingered hand H by a predetermined amount in step S351, a coarse-to-fine search method may be used. For example, first, the opening width may be increased by a large amount of change to search for an opening width with which the finger areas do not include an unmeasured area, and then the opening width may be reduced by a small amount of change to specify the minimum opening width with which the finger areas do not include an unmeasured area and to register the current opening width as an optimum value (step S354).

Furthermore, when the optimum gripping position/posture is decided in step S37, a configuration is also possible in which a plurality of gripping positions/postures are calculated in step S34, the procedure from step S35 onwards is performed on each of the gripping positions/postures, and the optimum gripping position/posture is decided from among them. At this time, the optimum gripping position/ posture may be decided based on another piece of information. For example, taking into consideration surrounding obstacles or the like, the gripping position/posture at which there is a low likelihood of interfering with any surrounding obstacles may be selected as the optimum gripping position/ posture.

Furthermore, the number of fingers of the multi-fingered hand H is not limited to two, and may also be three or more. Furthermore, information relating to the gripping position/ posture does not need to be seven-dimensional information as long as it is information for specifying the position and posture of the multi-fingered hand H. For example, the information may also be set independently for each finger.

Furthermore, the opening width between the fingers includes information that directly or indirectly determines the information indicating the distance between the fingers. For example, if the distance between the fingers of the multi-fingered hand H varies based on certain information, such information is included in the concept "opening width".

Second Embodiment

The following will describe a second embodiment. Note that the same reference numerals are added to the same elements, and description will be given with redundant descriptions simplified and mainly differences from other embodiments being focused on.

An embodiment includes, when the areas occupied by the fingers of the multi-fingered hand H include an unmeasured area UA, a step of further determining whether the unmeasured area UA is an unmeasured area UA that is likely to interfere with any finger of the multi-fingered hand H or an unmeasured area UA that is unlikely to interfere with any finger of the multi-fingered hand H, that is, an unmeasured area UA that can be ignored.

Figure 8:
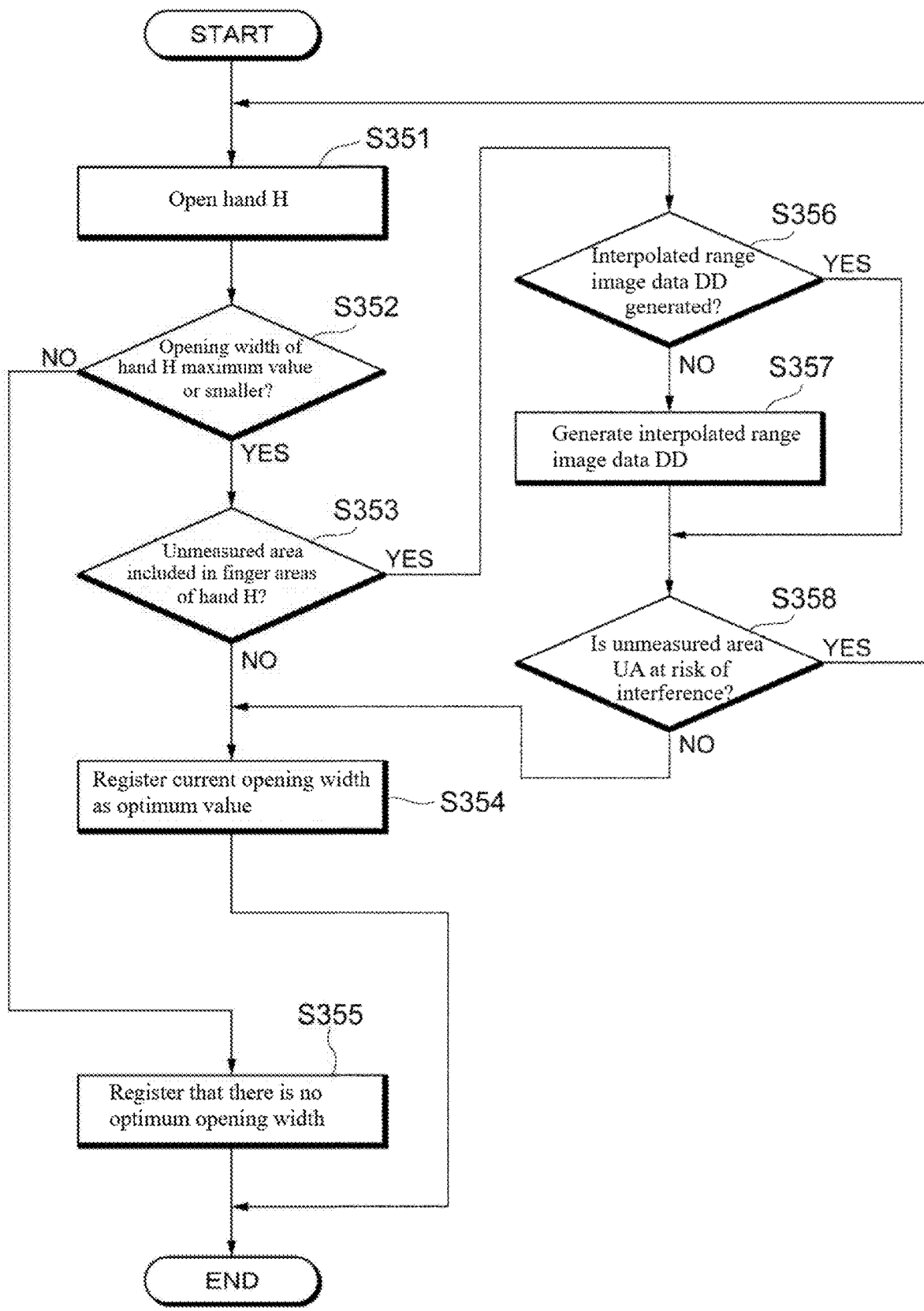
FIG. 8 is a flowchart illustrating a gripping method according to a second embodiment.

FIG. 8 is a flowchart for explaining such a step.

Note that a second embodiment includes steps S31 to S38 and steps S351 to S355 described in a first embodiment, and thus descriptions thereof are omitted. The following will describe the procedure from steps S356 to S358 that are performed after the determination in step S353 results in "YES".

First, it is determined whether or not interpolated range image data DD has been generated (step S356). Here, "interpolated range image data DD" refers to range image data DD in which, on a plane including the motion directions of the fingers of the multi-fingered hand H, an unmeasured area UA is interpolated using the smaller one of the distances represented by the range data at the boundaries between the unmeasured area UA and measured areas for which range data was obtained.

If no interpolated range image data DD has been generated (in the case of "NO"), interpolated range image data DD is generated (step S357).

Figure 9C:
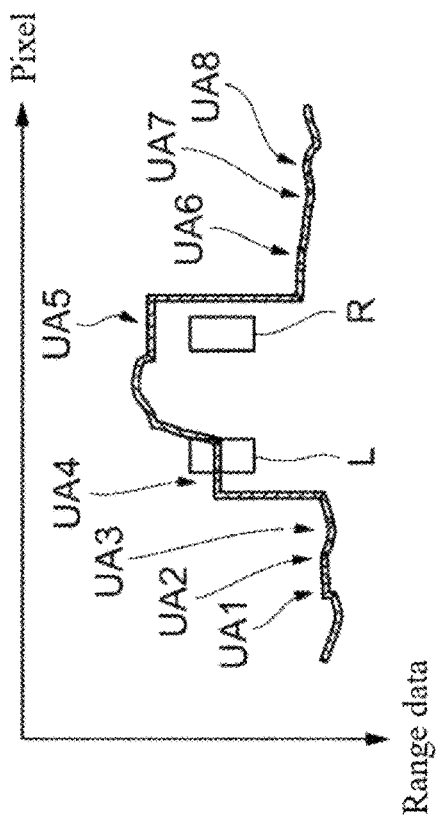
FIG. 9A to FIG. 9D are diagrams illustrating interpolated range image data.
Figure 9D:
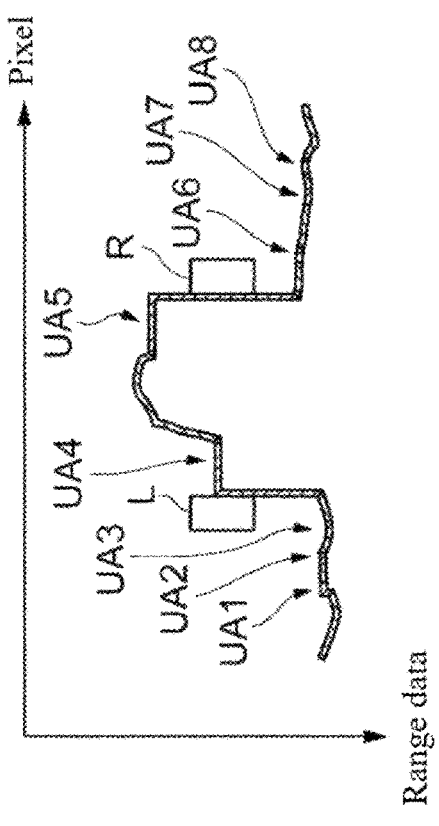
Figure 9A:
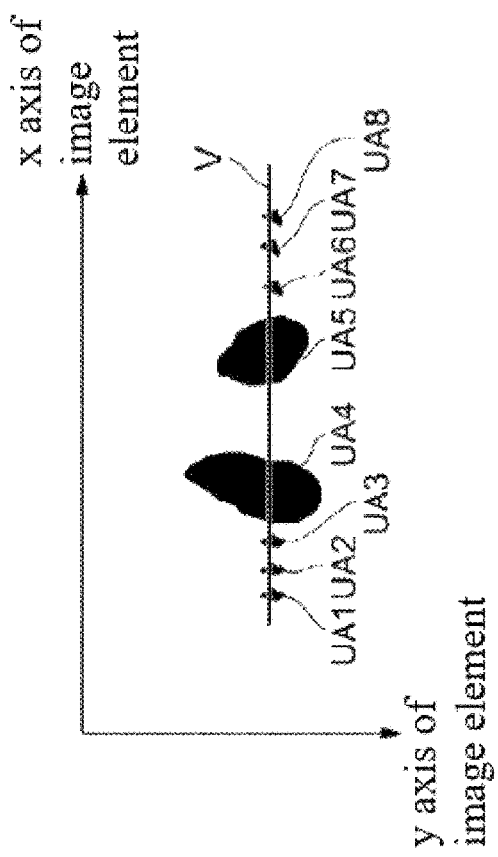

FIG. 9A to FIG. 9D illustrate the interpolated range image data DD. FIG. 9A shows that eight unmeasured areas UA1 to UA8 are present in the range image data DD. Furthermore, a line segment V indicates a range of motion of the fingers of the multi-fingered hand H. In an embodiment, the multi-fingered hand H is of the type of pinching and gripping a workpiece W with two fingers, and thus the range of motion of the fingers is indicated by the line segment V.

Figure 9B:
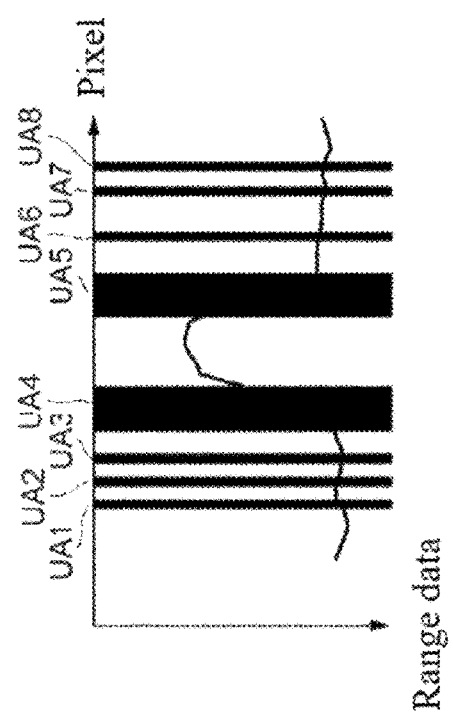

FIG. 9B shows a profile of the range data on the cross section taken along the line segment V including the range of motion of the fingers of the multi-fingered hand H. The vertical axis indicates the range data, and the value of the range data is larger, that is, the distance to the three-dimensional measurement sensor 16 is larger, toward the bottom of the figure. Furthermore, the range data for the unmeasured areas UA1 to UA8 is unknown.

FIG. 9C shows a profile after the interpolation. As shown in the profile, the unmeasured areas UA1 to UA8 are interpolated using the closer (smaller) one of two distances represented by the range data at the boundaries to the measured area.

The positions of the left finger L and the right finger R of the multi-fingered hand H are known based on the gripping position/posture calculated in step S34, and thus, by comparing the positions of the fingers with the profile, it is possible to determine whether or not each unmeasured area UA is likely to interfere with the multi-fingered hand H (step S358).

FIG. 9C shows that the unmeasured areas UA1 to UA3 and UA6 to UA8 are unmeasured areas UA that do not have the likelihood of interference, whereas the unmeasured areas UA4 and UA5 are unmeasured areas UA that have the likelihood of interference.

If any unmeasured area UA is at risk of interfering with the multi-fingered hand H (in the case of FIG. 9C), the procedure moves to step S351, and a step for further increasing the opening width of the multi-fingered hand H and then the above-descried steps are executed.

If no unmeasured area UA is at risk of interfering with the multi-fingered hand H (in the case of FIG. 9D), the current opening width is registered as an optimum value (sub step S354), and the optimum gripping position/posture for gripping the workpiece W is selected (step S37).

Figure 10A:
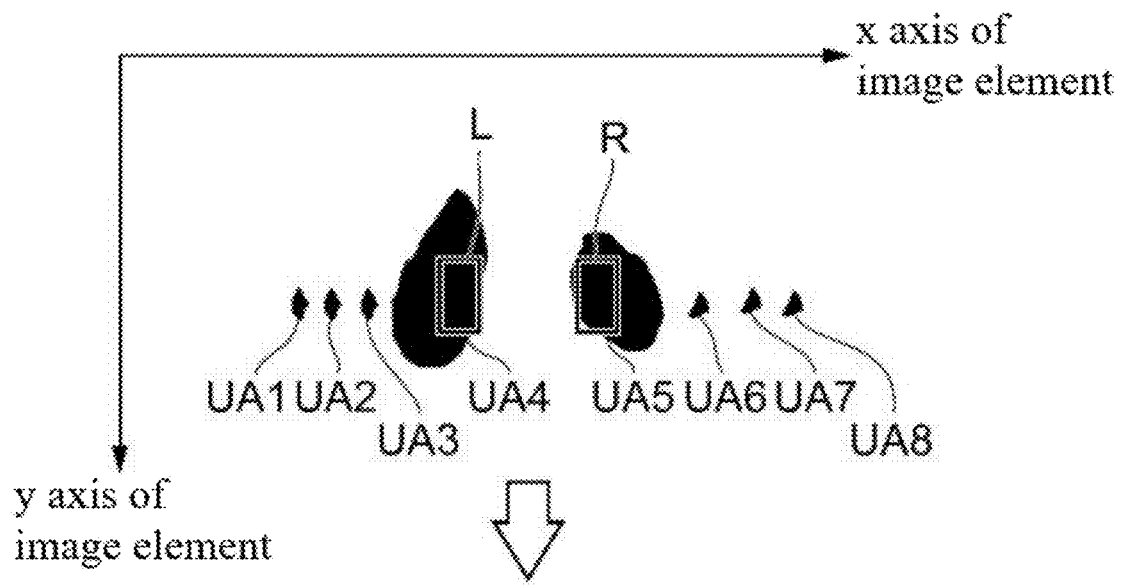
FIG. 10A and FIG. 10B are diagrams illustrating effects of a gripping method according to a second embodiment.
Figure 10B:
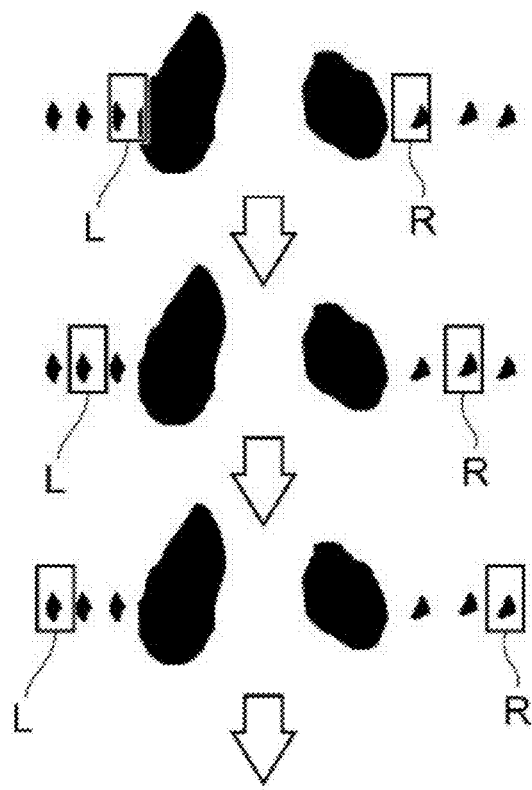

The effects of the above-described gripping method will be described with reference to FIG. 10A and FIG. 10B. FIG. 10A shows an example of the range image data DD. As described above, unmeasured areas may occur due to various reasons, and thus may be present in a scattered manner on the range image. Accordingly, if the determination is made only based on whether or not any of the finger areas occupied by the left finger L and the right finger R of the multi-fingered hand H include an unmeasured area UA, there may be cases where no optimum opening width is settled due to the unmeasured areas UA1 to UA3 and UA6 to UA8, which can essentially be ignored, even if the step for opening the multi-fingered hand H is repeatedly executed (FIG. 10B).

In contrast, the above-described gripping method is configured such that an unmeasured area UA is interpolated using range data of the surrounding measured area, so that the areas can be classified into unmeasured areas UA that are likely to interfere with the multi-fingered hand H and unmeasured area UA that are unlikely to interfere with the multi-fingered hand H. Accordingly, it is possible to select a more appropriate gripping position/posture. Particularly, the smaller value of range data of the surrounding measured area is employed as the range data for use in the interpolation. Therefore, it is possible to eliminate the risk of determining that it will not interfere with the hand although it will actually interfere with the hand, making it possible to grip the object without damaging it.

Note that, when determining whether or not the finger areas include an unmeasured area UA, it is also possible to remove any smaller unmeasured areas UA from the determination target.

Third Embodiment

The following will describe a third embodiment. Note that descriptions of the same or similar parts as those of other embodiments are simplified, and mainly the differences thereof will be described.

In the above-described embodiments, the shape of the workpieces W is known, and thus the workpiece shape data WD is used, for example, when the gripping position/posture is set. On the other hand, an embodiment will describe a gripping method that can be performed when the shape of workpieces W is unknown. Note however that the gripping method of an embodiment may also be applied to a workpiece W whose shape is known.

Figure 11:
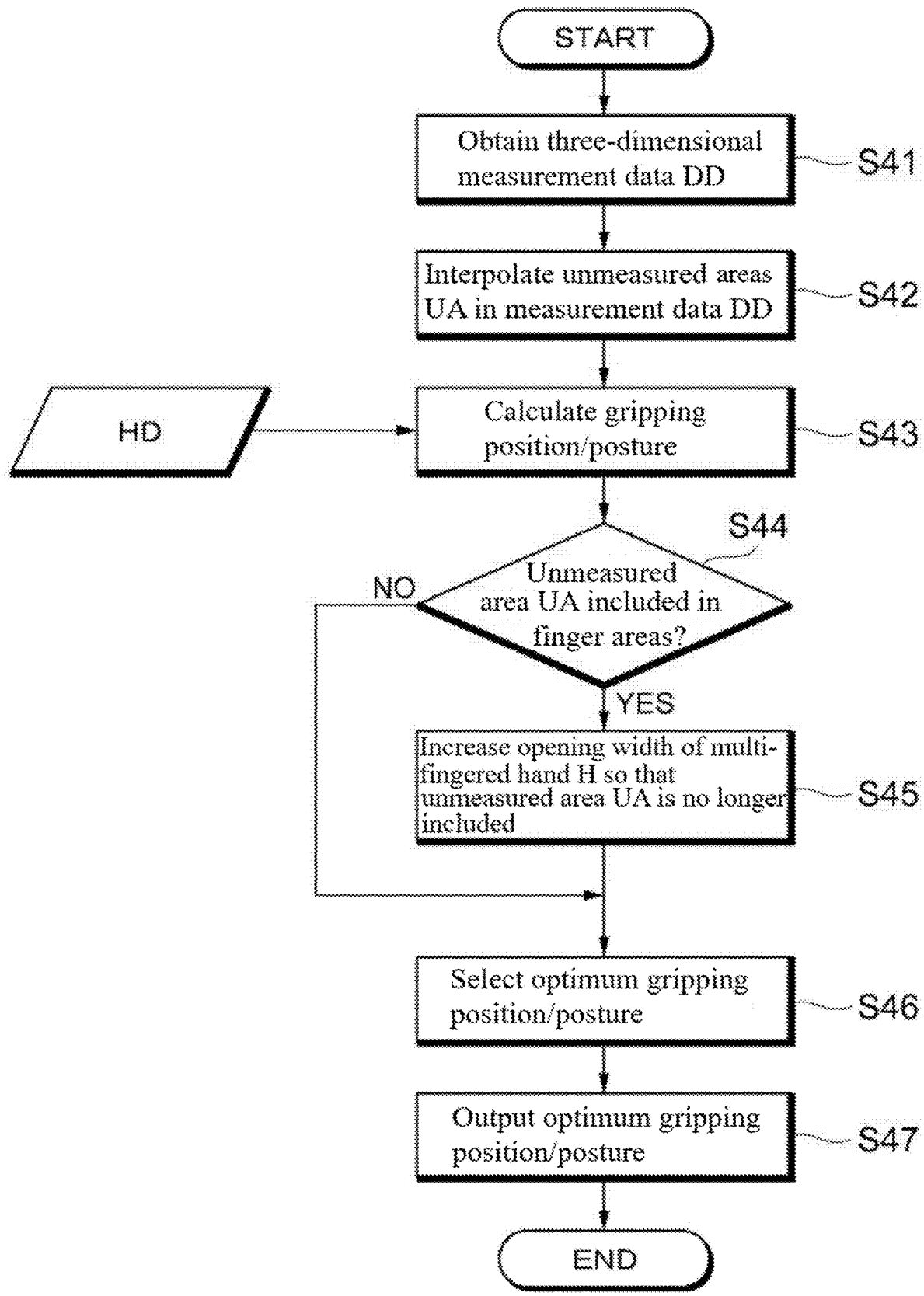
FIG. 11 is a flowchart illustrating a gripping method according to a third embodiment.

FIG. 11 is a flowchart of the gripping method according to an embodiment.

First, the three-dimensional measurement sensor 16 is used to obtain range image data DD (also referred to as "three-dimensional measurement data") (step S41).

Then, range data of unmeasured areas UA of the obtained range image data DD is interpolated (step S42). Specifically, an unmeasured area UA is interpolated using the farther (larger) one of two distances represented by the range data at the boundaries between the unmeasured area UA and measured areas based on the range data on a cross section including the operation areas of the fingers of the multi-fingered hand H.

Figure 12A:
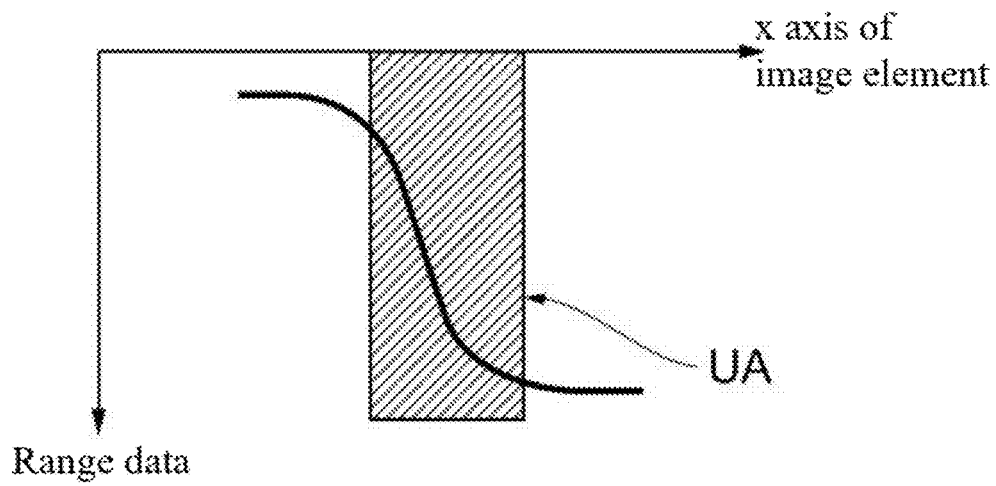
FIG. 12A, FIG. 12B, and FIG. 12C are diagrams each illustrating a method for interpolating range image data.

FIG. 12A shows a profile of the range data on the cross section.

Figure 12B:
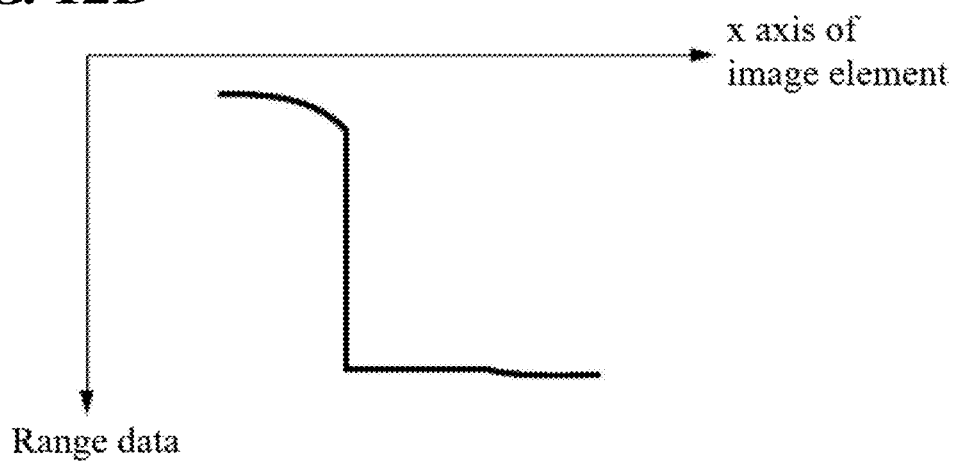

FIG. 12B shows a profile after the interpolation. It is shown that the unmeasured area UA is interpolated using the right side range data, which is the farther (larger) one, of two distances represented by the range data at the boundaries between the unmeasured area UA and the measured areas.

Figure 12C:
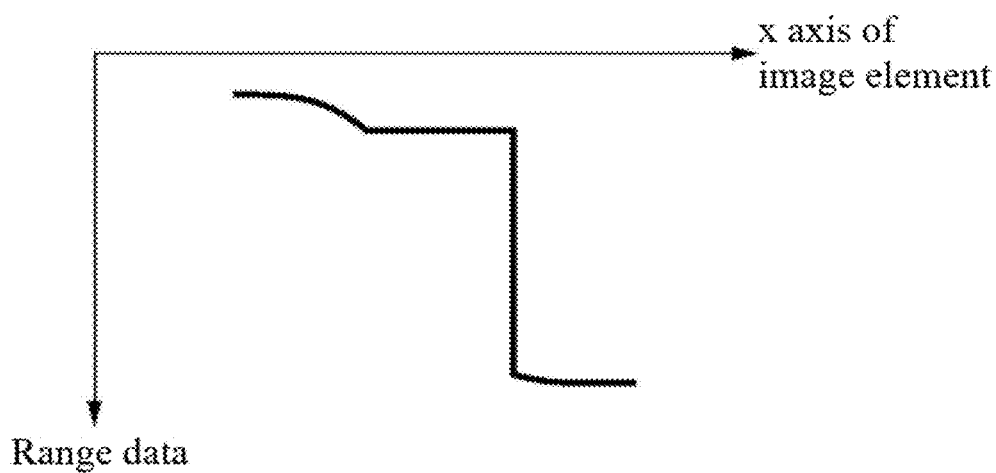

FIG. 12C shows a profile, as a comparative example, in a case where the unmeasured area UA is interpolated using the left side range data, which is the closer one (with the smaller range data), of the two distances represented by the range data at the boundaries between the unmeasured area UA and the measured areas.

Then, the gripping position/posture of the multi-fingered hand H is calculated (step S43). The gripping position/posture recognition unit 22 obtains the edge shape of a workpiece W based on the range image data DD in which the range data of the unmeasured areas UA has been interpolated in step S42. Furthermore, the hand shape data HD is read out from the storage medium 20. Then, the gripping position/posture of the multi-fingered hand H for gripping the workpiece W is calculated. Here, the calculated gripping position/posture is seven-dimensional information constituted by six-dimensional information for specifying the position and posture of the multi-fingered hand H, which corresponds to the distal end of the robot R, and one-dimensional information for defining the opening width of the multi-fingered hand H.

In subsequent steps S44 to S47, by executing steps S35 to S38 in FIG. 3 (and the sub steps shown in FIG. 5 or 8), it is possible to grip the workpiece W.

Accordingly, when the sub steps shown in FIG. 8 are executed, the range data based on the range image data DD including the unmeasured area UA is first interpolated so that the distance of the unmeasured area UA is large (FIG. 12B), one or more gripping positions/postures with which the workpiece W can be gripped are calculated (step S42), then range data based on the same range image data DD is interpolated so that the distance of the unmeasured area UA is small (FIG. 12C), and the opening width of the multi-fingered hand H when it is actually operated is specified (step S354).

Figure 13A:
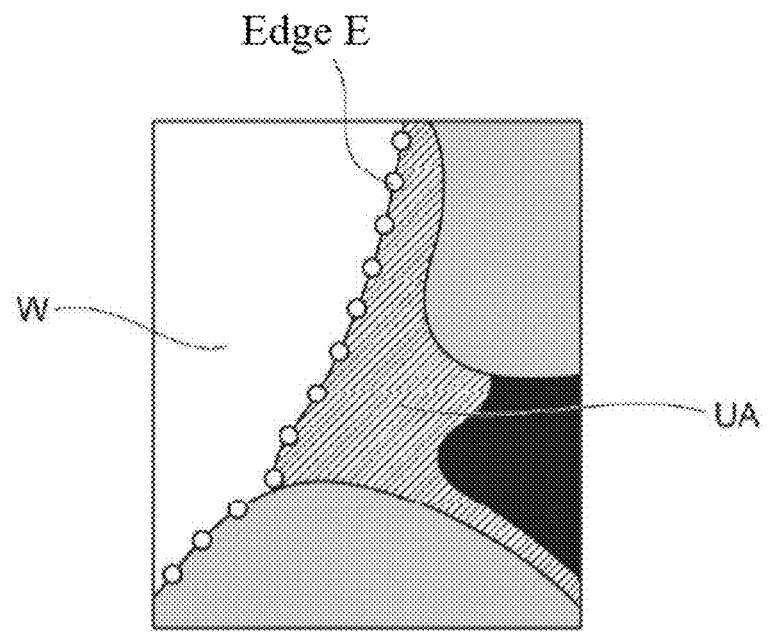
FIG. 13A and FIG. 13B are diagrams each illustrating difference in edges extracted based on difference between interpolation methods.
Figure 13B:
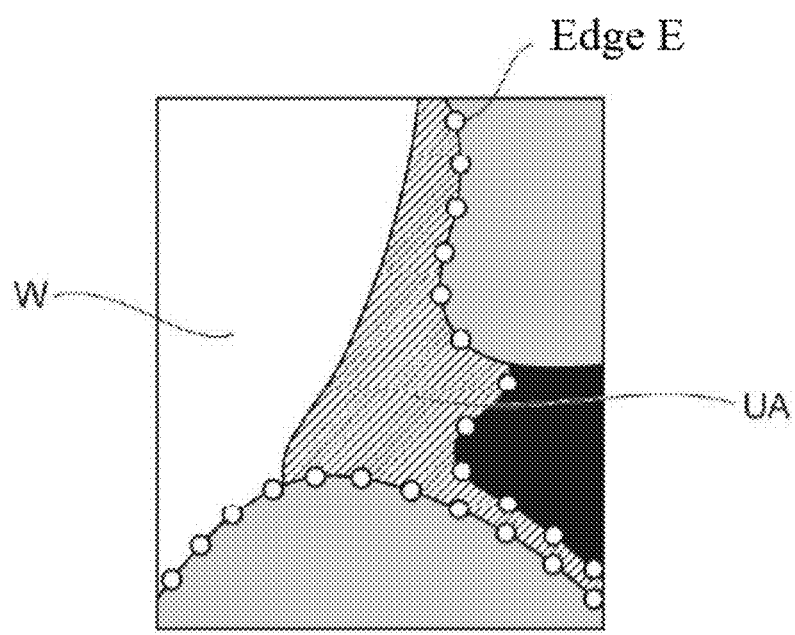

Hereinafter, effects achieved by performing the different types of interpolation will described with reference to the drawings. FIG. 13A shows edges E that can be extracted when an area AR shown in FIG. 4 is interpolated by the method shown in FIG. 12B, and FIG. 13B shows edges E that can be extracted when the same area AR is interpolated by the method shown in FIG. 12C. The distance between the three-dimensional measurement sensor 16 and the workpiece W is smaller than the distance between the three-dimensional measurement sensor 16 and the plane on which the workpiece W is placed. Accordingly, an unmeasured area UA is likely to be formed between the surface of the workpiece W (small distance) and the plane on which the workpiece W is placed (large distance). Also, on the surface of the workpiece W, a curve that has a constant distance between the three-dimensional measurement sensor 16 and the workpiece W is typically smooth, and thus the boundary between the measured area of the workpiece W and the unmeasured area UA is likely to be smooth.

Accordingly, as shown in FIG. 13A, the interpolation is performed so that the boundary between the measured area of the workpiece W and the unmeasured area UA is recognized as the edges E, and the edges E can be used when extracting the positions at which the workpiece W can be gripped by the multi-fingered hand H.

On the other hand, when determining the likelihood of interference, it is preferable to set the opening width of the multi-fingered hand H assuming that the unmeasured area UA adjacent to the workpiece W is an area that has a small amount of range data as with the workpiece W, in order to prevent the risk of interference. Accordingly, as shown in FIG. 13B, by performing the interpolation such that the boundaries between the unmeasured area UA and the measured areas to which the workpiece W is not adjacent are recognized as the edges E, it is possible to select the opening width of the multi-fingered hand H that can prevent interference accordingly.

As described above, in order to set the gripping position/posture of the multi-fingered hand H for gripping a workpiece W, the range image data DD is first interpolated so that the boundary between the workpiece W and the unmeasured area is recognized as edges. Accordingly, the edges E for which the range data changes significantly are easier detected than in the case where the range data of the unmeasured area is interpolated so as to continuously change from the workpiece W to the plane on which the workpiece W is placed. Accordingly, it is possible to recognize the shape of the workpiece W, and specify one or more positions at which the multi-fingered hand H can grip the workpiece W. Note however that an embodiment is not limited to this, and one or more positions at which the workpiece W can be gripped may be specified using another method.

On the other hand, when deciding the opening width of the fingers of the multi-fingered hand H, it is possible to interpolate the unmeasured area UA using the same range data as that of the workpiece W so as to suppress the likelihood of interference between the workpiece W and the fingers of the multi-fingered hand H.

In this way, if the range image data DD includes an unmeasured area UA, range image data DD is generated based on the two types of interpolation (including range image data DD based on the interpolation that is performed so that the area that contains the workpiece W and has the same range data as the workpiece W is large, and range image data DD based on the interpolation that is performed so that the area that contains the workpiece W and has the same range data as the workpiece W is small), and the generated range image data DD is used depending on the usage. Thus, it is possible to realize a more appropriate method for gripping a workpiece.

Note that, when performing interpolation, not all of the unmeasured areas UA need to be interpolated but only the necessary areas, for example, only those in the operation areas of the fingers of the multi-fingered hand H may be interpolated.

Furthermore, the interpolation is not necessarily performed using range data at the boundary between an unmeasured area UA and a measured area on a cross section including the operation areas of the multi-fingered hand H (one cross section if two fingers are provided, and three cross sections including the ranges of motion of the fingers if the multi-fingered hand H has three fingers). The interpolation may also be performed using, for example, average range data of the surrounding measured area.

The foregoing embodiments are provided for easy understanding of the present invention, and are not to be construed as limiting the present invention to the embodiments. The constituent components of the embodiments, and their layout, material, conditions, shape, sizes, and the like are not limited to the shown examples, and may be modified appropriately by a person skilled in the art without departing from the essence. Furthermore, configurations shown in different embodiments may be partially replaced or combined.

Note that, in the present specification, "unit" and "means", and "procedure" do not simply mean physical configurations, and may include a case in which the processing executed by the "unit" and the like is realized by software. Furthermore, processing that is performed by a single "unit" etc. or apparatus may be executed by two or more physical configurations or apparatus, or processing that is performed by two or more "unit" etc. or apparatus may be executed by a single physical means or apparatus.

At least one or all of the above-described embodiments can be described as, but are not limited to, the following appendixes.

APPENDIX 1

A gripping method for gripping an object using a multi-fingered hand provided with a plurality of fingers, comprising:

a step of measuring, using a sensor, an area that contains the object to obtain, for each position within the area, distance-indicating information that indicates a distance to the sensor; and a step of deciding positions of the plurality of fingers for gripping the object, by classifying the area, if the area includes an area for which the distance-indicating information could not be obtained in the previous step, into a measured area and an unmeasured area based on the distance-indicating information, the positions of the plurality of fingers being decided based on positions of the unmeasured area.

APPENDIX 2

A gripping system comprising:
a multi-fingered hand provided with a plurality of fingers for gripping an object;
a robot arm to which the multi-fingered hand is connected;
an obtaining unit configured to obtain, from a sensor for measuring an area that contains the object, distance-indicating information that indicates a distance to the sensor for each position within the area; and
a deciding unit configured to decide positions of the plurality of fingers for gripping the object, by classifying the area, if the area includes an area for which the distance-indicating information cannot be obtained, into a measured area and an unmeasured area based on the distance-indicating information, the positions of the plurality of fingers being decided based on positions of the unmeasured area.

APPENDIX 3

A program for gripping an object using a multi-fingered hand provided with a plurality of fingers, the program causing a computer to execute:
a step of measuring, using a sensor, an area that contains the object, to obtain, for each position within the area, distance-indicating information that indicates a distance to the sensor; and
a step of deciding positions of the plurality of fingers for gripping the object, by classifying the area, if the area includes an unmeasured area for which the distance-indicating information could not be obtained in the previous step, into a measured area and the unmeasured area based on the distance-indicating information, the positions of the plurality of fingers being decided based on positions of the unmeasured area.

The invention claimed is:

1. A gripping method for gripping an object using a multi-fingered hand provided with a plurality of fingers and a robot arm connected thereto, the method comprising:
measuring, using a sensor, an area that contains the object, to obtain, for each position within the area, distance-indicating information that indicates a distance from the object to the sensor at respective positions of at least a portion of the object within the area; and
deciding positions of the plurality of fingers for gripping the object, by:
classifying the area into a measured area based on the distance-indicating information and an unmeasured area for which the distance-indicating information could not be obtained;
interpolating distances to the sensor corresponding to positions of the object in the unmeasured area; and
deciding the positions of each finger of the plurality of fingers based on at least the distance-indicating information for the measured areas, and the interpolated distances to the sensor corresponding to positions of the object in the unmeasured area, wherein
the interpolated distances to the sensor for the unmeasured area are interpolated based on measured values of distances from the object to the sensor for the measured area obtained from the distance-indicating information, the measured values comprising a first measured value of a first distance at a first boundary and a second measured value of a second distance at a second boundary between the unmeasured area and the measured area on each respective side of the unmeasured area, the interpolating distances comprising setting the distances for the unmeasured area to a smaller one of the first measured value or the second measured value.

2. The gripping method according to claim 1, further comprising setting a position and a posture of the multi-fingered hand, wherein
deciding positions of each finger of the plurality of fingers for gripping the object further comprises:
determining whether any finger areas that correspond to respective ones of the positions of the plurality of fingers based on the set position and posture of the multi-fingered hand include the unmeasured area; and
setting a distance between the respective ones the plurality of fingers so that the respective finger areas do not include the unmeasured area based on determining that any of the finger areas include the unmeasured area.

3. The gripping method according to claim 2, further comprising:
approaching the object with the set distance between the plurality of fingers by moving the multi-fingered hand; and
reducing the distance between the fingers to grip the object.

4. The gripping method according to claim 1, further comprising setting a position and a posture of the multi-fingered hand, wherein
the unmeasured area comprises an unmeasured area between measured areas in which the plurality of fingers can move,
deciding positions of each finger of the plurality of fingers for gripping the object further comprises:
determining whether any finger areas that correspond to respective ones of the positions of the plurality of fingers based on the set position and posture of the multi-fingered hand include the unmeasured area;
interpolating the distances to the sensor for the unmeasured area using the smaller one of the first and the second measured values of the distances obtained at the first and the second boundaries between the unmeasured area and the measured areas on each respective side of the unmeasured area based on determining that any of the finger areas include the unmeasured area; and
determining a likelihood of interference with the object, based on the distance-indicating information of the interpolated distances to the sensor for unmeasured area using the smaller one of the two measured values of the distances and the position and posture of the multi-fingered hand.

5. The gripping method according to claim 1, wherein the unmeasured area comprises an unmeasured area between measured areas in which the plurality of fingers can move,
deciding positions of each finger of the plurality of fingers for gripping the object further comprises:
interpolating the distances to the sensor for the unmeasured area between measured areas in which the plurality of fingers can move, using a larger one of the first and the second measured values of the distances obtained at the first and the second boundaries between the unmeasured area and the measured areas; and
deciding the positions of each finger of the plurality of fingers, a position and a posture of the multi-fingered hand, based on the distance-indicating information of the interpolated distances to the sensor for the unmeasured area using the larger one of the two measured values of the distances and the distance-indicating information that indicates a distance to the sensor.

6. A gripping system comprising:

a multi-fingered hand provided with a plurality of fingers for gripping an object;

a robot arm to which the multi-fingered hand is connected; and a processor configured with a program to perform operations comprising:

operation as an obtaining unit configured to obtain, from a sensor for measuring an area that contains the object, distance-indicating information that indicates a distance from the object to the sensor for each position of at least a portion of the object within the area within the area; and operation as a deciding unit configured to decide positions of the plurality of fingers for gripping the object, by classifying the area into a measured area based on the distance-indicating information and an unmeasured area for which the distance-indicating information cannot be obtained, interpolating distances to the sensor corresponding to positions of the object in the unmeasured area, deciding the positions of each finger of the plurality of fingers based on at least the distance-indicating information for the measured areas, and the interpolated distances to the sensor corresponding to positions of the object in the unmeasured area, wherein the interpolated distances to the sensor for the unmeasured area are interpolated based on measured values of distances from the object to the sensor for the measured area obtained from the distance-indicating information, the measured values comprising a first measured value of a first distance at a first boundary and a second measured value of a second distance at a second boundary between the unmeasured area and the measured area on each respective side of the unmeasured area, the interpolating distances comprising setting the distances for the unmeasured area to a smaller one of the first measured value or the second measured value.

7. The gripping system according to claim 6, wherein the processor is further configured with the program to perform operations such that operation as the deciding unit comprises operation as the deciding unit configured to decide the positions of each of the plurality of fingers so that the plurality of fingers are present in the measured area.

8. The gripping system according to claim 7, wherein the processor is further configured with the program to perform operations such that operation as the deciding unit comprises operation as the deciding unit configured to:

determine whether any of the plurality of fingers are present in the unmeasured area, and decide the positions of each of the plurality of fingers so that the plurality of fingers are present in the measured area based on determining that any of the plurality of fingers are present in the unmeasured area.

9. The gripping system according to claim 6, wherein the processor is further configured with the program to perform operations such that operation as the deciding unit comprises operation as the deciding unit configured to:

determine whether any of the plurality of fingers are present in the unmeasured area, and decide the positions of each finger of the plurality of fingers so that the plurality of fingers are present in the measured area based on determining that any of the plurality of fingers are present in the unmeasured area.

10. A non-transitory computer-readable storage medium storing a program for gripping an object using a multi-fingered hand provided with a plurality of fingers and a robot arm connected thereto, the program causing a computer to perform operations comprising:

measuring, using a sensor, an area that contains the object, to obtain, for each position within the area, distance-indicating information that indicates a distance from the object to the sensor for each position of at least a portion of the object within the area; and deciding positions of the plurality of fingers for gripping the object, by:

classifying the area into a measured area based on the distance-indicating information and an unmeasured area for which the distance-indicating information could not be obtained;

interpolating distances to the sensor corresponding to positions of the object in the unmeasured area; and deciding the positions of each finger of the plurality of fingers being decided based on at least the distance-indicating information for the measured areas, and the interpolated distances to the sensor corresponding to positions of the object in the unmeasured area, wherein the interpolated distances to the sensor for the unmeasured area are interpolated based on measured values of distances from the object to the sensor for the measured area obtained from the distance-indicating information, the measured values comprising a first measured value of a first distance at a first boundary and a second measured value of a second distance at a second boundary between the unmeasured area and the measured area on each respective side of the unmeasured area, the interpolating distances comprising setting the distances for the unmeasured area to a smaller one of the first measured value or the second measured value.

11. The non-transitory computer-readable recording medium storing the program according to claim 10, wherein deciding positions of each of the plurality of fingers comprises deciding positions of the plurality of fingers so that the plurality of fingers are present in the measured area.

12. The non-transitory computer-readable recording medium storing the program according to claim 11, wherein deciding positions of the plurality of fingers further comprises:

determining whether any of the plurality of fingers are present in the unmeasured area; and deciding the positions of each of the plurality of fingers so that the plurality of fingers are present in the measured area based on determining that any of the plurality of fingers are present in the unmeasured area.

13. The non-transitory computer-readable recording medium storing the program according to claim 10, wherein deciding positions of the plurality of fingers further comprises:

determining whether any of the plurality of fingers are present in the unmeasured area; and deciding the positions of each of the plurality of fingers so that the plurality of fingers are present in the measured area based on determining that any of the plurality of fingers are present in the unmeasured area.

\* \* \* \* \*